Figure 1:
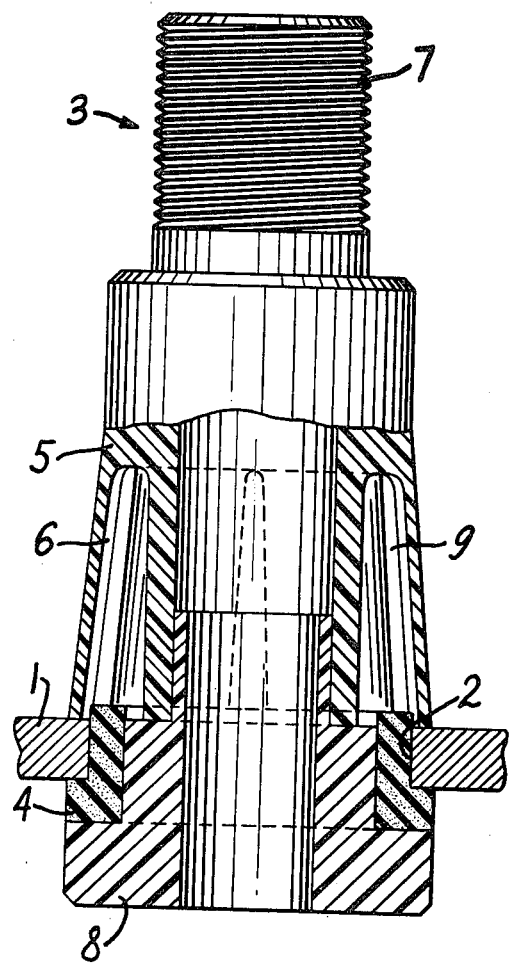

United States Patent [19]

Lefrancois

[11] 4,364,427
[45] Dec. 21, 1982

[54] TIRE VALVES FOR TUBELESS AND TUBE TIRES

[75] Inventor: Jean Lefrancois, Clermont-Ferrand, France

[73] Assignee: Compagnie Generale des Etablissments Michelin, Clermont-Ferrand, France

[21] Appl. No.: 265,394

[22] Filed: May 20, 1981

Related U.S. Application Data

[63] Continuation of Ser. No. 101,632, Dec. 10, 1979, abandoned, which is a continuation of Ser. No. 891,467, Mar. 29, 1978, abandoned.

[30] Foreign Application Priority Data

Mar. 30, 1977 [FR] France ................................ 77 09859
Oct. 18, 1977 [FR] France ................................ 77 31544

[51] Int. Cl.³ ........................ B60C 29/00; B60C 5/00
[52] U.S. Cl. .................................. 152/349; 24/213 R; 137/223; 152/427; 152/429; 152/DIG. 11; 285/162; 285/319; 285/DIG. 22; 411/182; 411/508
[58] Field of Search ............... 152/415, 427, 428, 429, 152/430, 349, 356, DIG. 11, DIG. 13; 285/162, 319, DIG. 22; 411/182, 189, 508; 137/223; 24/213 R, 214, 220, 225 SL, 255 R, 257; 141/38

[56] References Cited

U.S. PATENT DOCUMENTS

| 1,542,704 | 6/1925 | Kirkpatrick | 152/427 |
| 1,966,428 | 7/1934 | Brown | 152/427 |
| 2,054,965 | 9/1936 | Clo | 152/427 |
| 2,180,960 | 11/1939 | Kennedy | 152/427 |
| 2,844,183 | 7/1958 | McCord et al. | 152/427 |
| 2,954,248 | 9/1960 | Brickman | 285/DIG. 22 |
| 3,536,119 | 10/1970 | Mayer | 152/427 |
| 3,542,109 | 11/1970 | Stroh | 152/427 |
| 4,049,037 | 9/1977 | Gale et al. | 152/427 |

FOREIGN PATENT DOCUMENTS 829648 3/1960 United Kingdom .

Primary Examiner—Edward C. Kimlin
Assistant Examiner—Thomas Bokan
Attorney, Agent, or Firm—Brumbaugh, Graves, Donohue & Raymond

[57] ABSTRACT

The periphery of the portion of the valve body of a tire valve which is located on the outside of the wheel rim is composed of elements which are elastic in transverse direction and rigid in longitudinal direction. Tightness is assured by a sealing joint. The valve body may be of a single piece or of two pieces.

3 Claims, 3 Drawing Figures

TIRE VALVES FOR TUBELESS AND TUBE TIRES

This is a continuation of application Ser. No. 101,632 filed Dec. 10, 1979, now abandoned, which is a continuation of application Ser. No. 891,467, Mar. 29, 1978, now abandoned.

This invention relates to tire valves and more particularly to the manner for the airtight fastening and clamping thereof on their support.

It is known that tires are used with or without an inner tube; in the former case, the valves are fastened to the inner tube and then threaded into a hole which passes through the rim so as to make them accessible from the outside; in the latter case, the valves are fastened directly to the rim, through which they pass in airtight manner.

The embodiments existing up to the present time have the following drawbacks: the valves for inner tubes are vulcanized together with the inner tubes which complicates manufacture; valves for mounting without an inner tube are fastened to the rim either by the clamping of a nut, which is expensive, or by the deforming of a rubber bulb within the hole in the rim, which is not very reliable.

The object of the present invention is a valve which overcomes these drawbacks while permitting economical manufacture and simple and rapid use, whatever the support (inner tube or rim).

A tire valve in accordance with the invention is characterized by the fact that it has at least one element which is elastic in transverse direction and rigid in longitudinal direction and the end of which is capable of moving in transverse direction and then resuming its initial shape, thus assuring the fastening of the valve and its tightness on its support by clamping the support between the transversely elastic element and an outer portion of the valve body.

In a variant of the invention which is adapted to tubeless tires, the outer portion of the valve body is rigidly connected with at least one element which is elastic in transverse direction and rigid in longitudinal direction and the end of which is capable of retracting for passage through a valve hole and then expanding and resuming its initial shape, thus assuring the fastening of the valve and its tightness on a rim by compressing an elastic sealing joint interposed between the valve and the rim.

In a variant of the invention which is adapted to tires with an inner tube, the periphery of the portion of the valve body which is located, after mounting, on the outside of the inner tube is formed of at least one element which is elastic in transverse direction and rigid in longitudinal direction and is capable of retracting for passage through a rigid washer of suitable shape and then of resuming its initial shape, thus assuring the fastening and tightness of the valve on the inner tube by compression of the inner tube and, possibly, of its reinforcement disk between the valve base and the rigid washer.

In a preferred variant of the invention, the valve is produced by molding a single piece of plastic material on which the elastic elements are integrally molded or else are subsequently mounted.

The direction parallel to the axis of the valve is referred to as the longitudinal direction and any direction perpendicular to said axis is referred to as the transverse direction.

Figure 2:
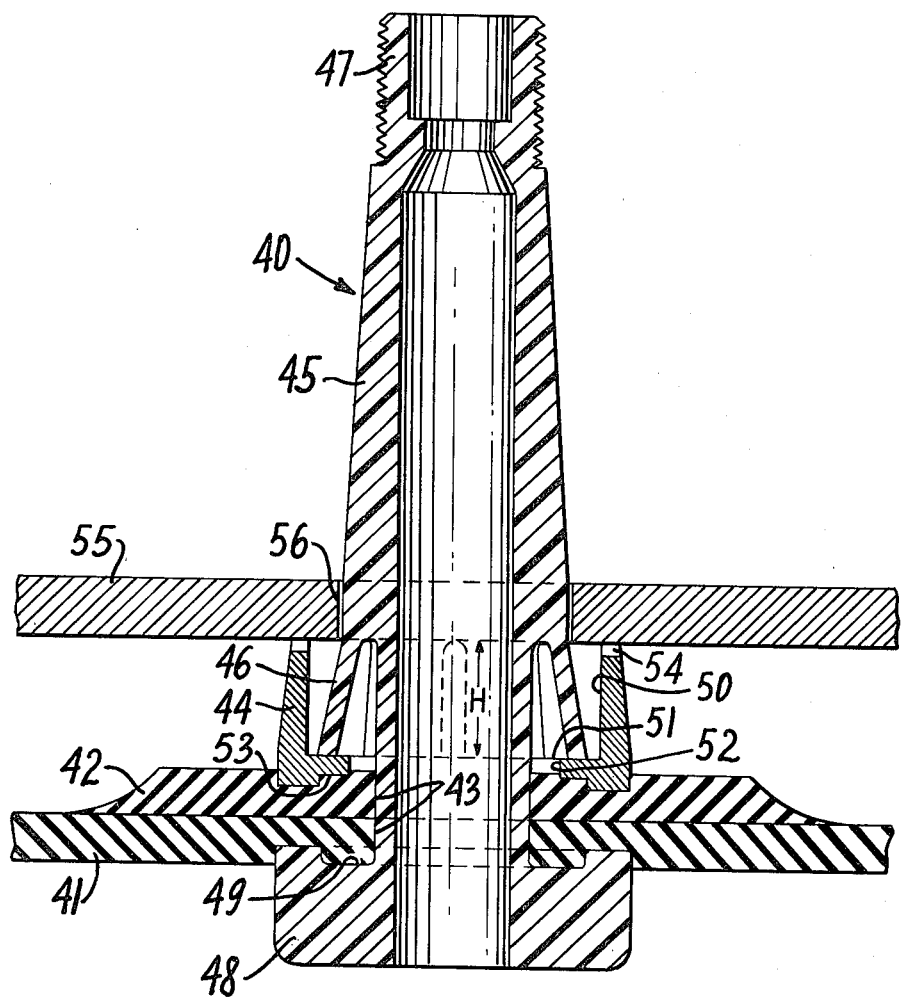
Figure 3:
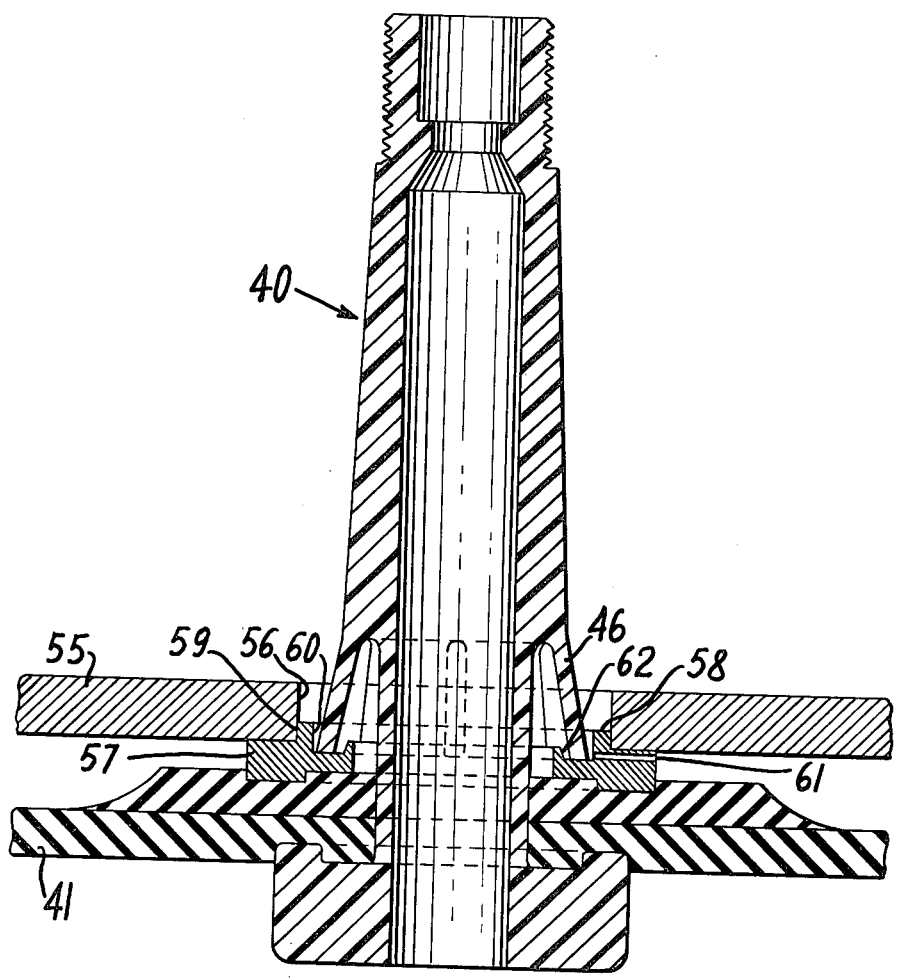

Several embodiments of the valve forming the object of the present invention will now be described, by way of illustration and not of limitation, with reference to the accompanying drawing in which:

FIG. 1 is a view in elevation and partial axial section of a valve mounted on a rim (without inner tube); and FIGS. 2 and 3 are views in axial section of a valve attached to an inner tube and mounted in two different rims with different washers.

Referring to FIG. 1, the wheel rim 1 has a circular valve hole 2 within which a valve 3 is mounted with the interposition of an elastic sealing joint 4. This represents a mounting without an inner tube.

In accordance with the invention, the valve 3, which is made of plastic, comprises a valve body 5 whose periphery on the outside of the rim 1 is formed of elements, such as 6, which are elastic in the transverse direction and rigid in the longitudinal direction; these transversely elastic elements 6 are formed here by grooves 9 in a skirt which is molded integral with the valve body 5 and hence the transversely elastic elements 6 are formed of tongues arranged along a conical surface around the valve body 5.

The valve body 5 is terminated in manner known per se by an externally threaded end or nose 7 which is intended to receive a cap (not shown).

This valve 3 may be made by assembling two parts of molded plastic, namely, the valve body 5 and the valve base 8, which are glued or heat-sealed hermetically together, but may advantageously be produced by molding in a single piece.

The mounting of this valve 3 on the rim 1 is very simple: it is presented from the inside of the rim 1, the nose 7 facing the outside of the rim 1, and pushed into the valve hole 2; the transversely elastic elements 6 retract upon passage through the valve hole 2 and then expand and resume their initial shape, thus assuring the fastening of the valve 3 and its tightness on the rim 1 by compressing of the elastic sealing joint 4 interposed between the valve 3 and the rim 1. The shape of the elastic sealing joint 4 makes it possible, by its compression, to mount the valve 3 on rims 1 of different commonly used thicknesses.

Among the possible variants, the transversely elastic elements 6 can be made of a separate piece which is attached to the valve body 5, the valve body 5 and the valve base 8 being then capable of being molded integrally at the same time.

FIG. 2 shows an inner tube 41 and its optional reinforcement plate 42 each of elastomer and having a circular hole 43 permitting the passage of the valve base 48, in the manner which will be described further below. The valve 40 has a valve body 45, the periphery of the portion of which outside the inner tube 41 is formed of elements, such as 46, which are elastic in the transverse direction and rigid in the longitudinal direction.

At one end of the valve body 45 there is, in known manner, an externally threaded nose 47 intended to receive a cap (not shown), while at the other end there is a valve base 48, the face of which in contact with the inner tube 41 is concave so as to form a recess 49 in which the elastomeric material of the inner tube 41 expands upon the clamping.

Finally, a rigid washer 44 of metal or other material located on the outside of the inner tube 41 permits the fastening and tightening of the valve 40 on the inner tube 41 as a result of its suitable shape, which comprises:

an outer cylindrical joggle 50 and an inner circular stop 51 which assure the proper centering of the valve 40 in the washer 44 and the fastening and tightness of the valve 40 on the inner tube 41;

a hole 52 of a diameter suitable to permit the passage of the valve body 45 and of the transversely elastic elements, such as 46, upon the mounting;

a recess 53 into which the elastic material of the reinforcement plate 42 expands upon the clamping; and crenellations 54 which permit the air contained between the inner tube 41 and the rim 55 or the tire (not shown) to discharge through the hole 56 of the rim upon inflation or travel.

As the pressure within the inner tube 41 has a tendency to push the valve 40, and particularly its transversely elastic elements 46, into the hole 56 of the rim 55, the height H of the joggle 50 must be sufficient so that the transversely elastic elements 46 are not stressed in compression towards the axis of the washer 44 as this would have the effect of loosening the valve 40 from the washer 44 and doing away with the fastening and tightness of the assembly. In practice, this height H is equal substantially to the length of the transversely elastic elements 46.

The mounting of the valve 40 which has just been described is effected in the following fashion: the valve base 48 is introduced into the hole 43 of the elastomeric inner tube 41; the rigid washer 44 is placed over the valve body 45 and pushed until the transversely elastic elements 46, after having been compressed in the hole 52, expand again into the joggle 50; this push has the effect of strongly compressing the inner tube 41 and its plate 42 between the recess 49 of the valve base 48 and the recess 53 of the washer 44, which assures the fastening (and tightness) by expansion of the elastomer between these two recesses. Finally, the inner tube 41 is mounted in normal manner within the tire (not shown) and the valve 40 is mounted in the hole 56 of the rim 55.

FIG. 3 shows a variant of the valve of the present invention; it differs from the preceding embodiment by the diameter of the valve hole and the shape of the fastening washer.

The hole 56 in the rim 55 is of larger diameter than the hole 56 shown in FIG. 2. The rigid washer 57, which is of metallic or other material, has two grooves in its outer face 58, an outer groove 59 which assures the centering of the valve-washer assembly in the rim hole 56, and an inner circular groove 60, the outer edge of which circular groove 60 has a radius slightly greater than the distance between the free ends of the transversely elastic elements 46 and the axis of the valve 40. Finally, boreholes, such as 61, permit the air contained between the inner tube 41 and the rim 55 or within the tire (not shown) to discharge through the hole 56.

This washer 57 could just as well be used with a rim hole 56 of smaller diameter, such as shown in FIG. 2; in this case, when the pressure of the inner tube 41 tends to flatten it against the rim 55 and therefore to push the valve 40 into the hole 56 and compress the transversely elastic elements 46 towards the axis, these elements 46 are blocked in their movement by an inner rim 62 of the circular groove 60.

The advantages of the valve which forms the object of the present invention are numerous—its lightness (4 grams fully equipped, as compared with 12 grams for a rubber valve and 28 grams for a metal valve) which considerably facilitates the balancing of the wheel; its simplicity of manufacture (by molding) and of insertion (by simple push) which decreases its cost; its possibility of automatic adaptation to different thicknesses of rims; its small volume, which makes it possible to insert it within very narrow places; its firm fastening to the rim; and its easy removal.

Finally, this valve is provided with an inner movable unit (not shown), advantageously one such as described in French patent application No. 77 07578 of Mar. 11, 1977 corresponding to U.S. application Ser. No. 884,752, filed Mar. 9, 1978 (now abandoned and superseded by U.S. continuation-in-part application Ser. No. 104,188, filed Dec. 17, 1979, which in turn is now also abandoned and superseded by U.S. divisional application Ser. No. 223,576, filed Jan. 9, 1981), which still further improves its overall economy.

What is claimed is:

1. A tire valve for tubeless tires having a valve body and a valve base, characterized by the fact that the valve body has a plurality of tongues integral with the valve body, the tongues being arranged as a conical surface around the periphery of the valve body for engagement with the outside of a wheel rim, the conical surface being open towards the valve base, the tongues being elastic in transverse direction and rigid in longitudinal direction, and free ends of the tongues being capable of moving in transverse direction and then resuming their initial shape, thus enabling an elastic sealing ring to be tightened between the valve base and a valve hole in the wheel rim; said valve body, including its tongues, and valve base being formed of an integrally molded plastic material.

2. A tire valve for tires with an inner tube having a valve body and a valve base, characterized by the fact that it comprises:
   (a) an element having tongues which are arranged as a conical surface around the periphery of the valve body for indirect engagement with the inner tube and which are elastic in transverse direction and rigid in longitudinal direction and free ends of which are capable of moving in transverse direction and then resuming their initial shape, and
   (b) a rigid washer beneath the element for engagement with the inner tube, the rigid washer having an outer circular joggle whose height is substantially equal to the length of the tongues; said valve body, valve base and element being formed of an integrally molded plastic material.

3. A tire valve for tires with an inner tube having a valve body and a valve base, characterized by the fact that it comprises
   (a) an element having tongues which are arranged as a conical surface around the periphery of the valve body for indirect engagement with the inner tube and which are elastic in transverse direction and rigid in longitudinal direction and free ends of which are capable of moving in transverse direction and then resuming their initial shape, and
   (b) a rigid washer beneath the element for engagement with the inner tube, the rigid washer having a circular groove in its outer face, the outer edge of which circular groove has a radius slightly greater than the distance between the free ends of the tongues and the axis of the valve;
said valve body, valve base and element being formed of an integrally molded plastic material.

* * * * *